Dec. 19, 1950 R. D. HENDERSON 2,534,515
CIRCUMFERENTIALLY TRAVELING SUPPORT
MOUNTED, TIRE MOUNTING APPARATUS
Filed May 16, 1946
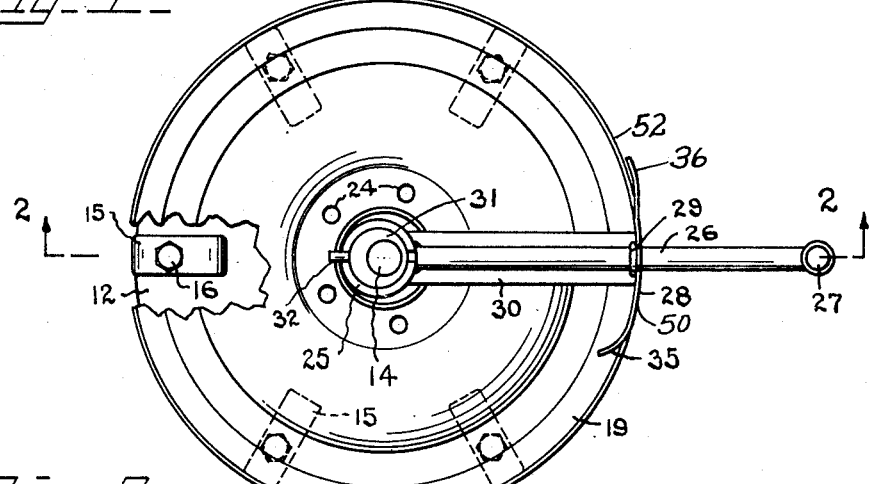
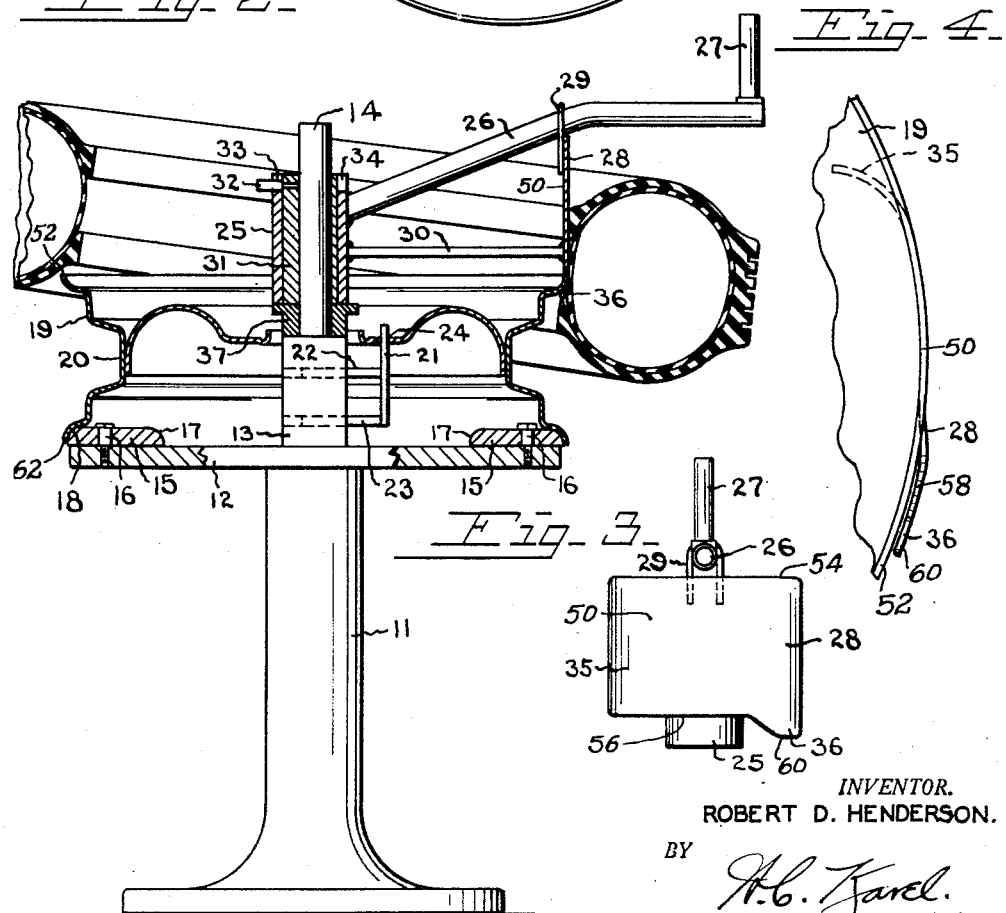
INVENTOR.
ROBERT D. HENDERSON.
BY
*H.C. Karel.*
ATTORNEY.

Patented Dec. 19, 1950

2,534,515

UNITED STATES PATENT OFFICE 2,534,515

CIRCUMFERENTIALLY TRAVELING SUPPORT MOUNTED, TIRE MOUNTING APPARATUS

Robert D. Henderson, Cincinnati, Ohio

Application May 16, 1946, Serial No. 670,271

2 Claims. (Cl. 157—1.24)

This invention relates to an apparatus for mounting inflatable tires on a wheel and particularly adaptable for mounting both beads of the tire on a drop center wheel. Heretofore many tires were damaged due to the methods employed and much time was consumed in mounting the tire on the wheel. With my improved apparatus the tire is easily threaded on the wheel through the operation of two revolutions of the tool to thread first one bead and then the other bead onto the rim of the wheel, or when lightweight tires are to be mounted both beads can be threaded onto the rim with one revolution of the tool. The inner tube is protected at all times and it is impossible to pinch the tube or damage the tire with this apparatus.

The object of my invention is to provide an apparatus whereby a tire and tube can be mounted on a wheel, quickly, simply and with a minimum amount of effort.

A further object is to provide a tool which will guide and thread the tire onto the wheel.

A further object is to provide a tool having a guiding face rotatable above and in alignment with the rim of the wheel and having a depending portion extending over and below the plane of the upper edge of the rim to engage the bead of the tire for threading the tire onto the rim.

My invention will be further readily understood from the following description and claims, and from the drawings, in which latter:

Fig. 1 is a plan view of my improved apparatus.

Fig. 2 is a side view of the same, partly in section, taken in the plane of the line 2—2 of Fig. 1.

Fig. 3 is an end view of the tool, and;

Fig. 4 is an enlarged bottom view of the plate and rim.

My improved apparatus comprises a supporting stand 11 to which a table 12 is suitably secured. A central shaft 13 extends upwardly from the table and has a reduced upper portion 14. Adjacent to the outer periphery of the table are a plurality of lugs 15 arranged to be rotated on studs 16 to accommodate the two sizes of wheels which predominate in the pleasure car field, although suitable adjustable means may be employed to position wheels of other sizes on the table concentric with the shaft. The lugs 15 are provided with curved faces 17 to engage the inner face 18 of the wheel 19. This apparatus is particularly useful for mounting tires on so called drop center wheels wherein the wheel has a recessed center portion 20.

Means are provided to prevent the wheel turning on the table and consists of a vertical pin 21 being connected to a pair of pins 22 and 23 slidable in the shaft 13. One of the lug holes 24 in the wheel is received over the pin 21 when the wheel is placed on the table to hold the wheel against rotation.

The tire mounting tool comprises a sleeve 25 having an upper support, arm or lever 26 extending from the sleeve and terminating in a handle 27. A member or guide plate 28 may be secured to the support as by a U-shaped member 29 welded to the plate. A lower brace 30 extends from the sleeve to the plate being welded to each. An eccentric bushing 31 is received in the sleeve 25 and is rotatable therein to set the plate 28 in the proper position for the two sizes of wheels. This bushing has an extending pin 32 arranged to be received in either one or the other of the slots 33 or 34 in the sleeve. Thus by rotating the bushing 180 degrees the plate can be set for the proper diameter of wheel.

Plate 28 includes an inturned, forward or leading edge or portion 35, an intermediate portion 50 and a rear or trailing portion 36. With reference now to Figs. 1 and 4, it will be observed that the major length of the intermediate portion substantially overlies a segment of the outer periphery 52 of the rim of a wheel on which a tire is to be mounted. The forward or leading portion 35 is turned inwardly toward the axis about which lever 26 is rotated, thereby disposing said leading portion interiorly of the outer periphery 52 of wheel 19. In the preferred embodiment of the invention the upper and lower edges 54 and 56 of member or guide plate 28 may be disposed in substantial parallelism, as disclosed in Fig. 3, it being understood that the lower edge of the intermediate portion is constructed and arranged to freely abut and ride upon the outer edge 52 of the rim of a wheel.

The rear or trailing portion 36 is turned outwardly from the mean plane of intermediate portion 50 in overhanging relationship with the outer periphery of the wheel. As clearly illustrated in Fig. 3, the lower edge of the trailing portion is defined by a downwardly inclined bearing edge 58 which terminates in a depending bearing portion or foot 60 disposed below and in spaced relationship with lower edge 56 of intermediate portion 50.

Preferably the leading, intermediate and trailing portions are disposed in planes which are substantially parallel with the axis of rotation of lever 26, see Fig. 1. The lateral spacing between the upper and lower edges 54 and 56 is of a dimension approximating or exceeding the lateral spacing of the inner and outer beads of the largest tire to be handled by my device.

As hereinabove indicated the intermediate portion of the plate 28 follows the general contour of the wheel rim with the lower edge 56 thereof just above, or resting upon the rim edge 52 of the wheel and the trailing portion 36 extending outwardly over the rim in close proximity thereto and following the contour of the rim. To adjust the device for various width wheels spacers 37 may be inserted below the sleeve 25, however, my device operates equally well without resorting to the use of such spacers, since sleeve 25 will be automatically positioned upon shaft 14 by reason of the engagement of lower edge 56 of the guide plate or member 28 with the outer edge of the rim of a wheel supported on table 12. As illustrated in Figs. 2 and 3, sleeve 25 is not fixed against axial movement relative to shaft 14 but is slideably, and rotatably mounted thereon.

To mount a tire on a wheel with my improved device; the wheel is placed on the table with the lugs 15 engaging the rim to center the wheel on the table with the pin 21 engaging a lug aperture 24. The proper spacer 37 may be placed on the shaft and with the tube partly inflated and inserted in the casing, the tire is placed over the wheel in an angular position (see Fig. 2) and the valve stem attached to the wheel in the usual manner. The tire tool may be then placed on the central shaft whereby lower edge 56 of the intermediate portion of the guide plate may abut or rest upon the outer edge 52 of the wheel. Holding the tire down with one hand near the valve stem, the tool is rotated in a clockwise direction in advance of the holding position and the plate 28 will guide the casing and tube into alignment with the outer face of the rim. As the tool is rotated, with its leading edge or portion 35 foremost, those portions of the lower bead which are disposed above the rim and interiorly of outer rim edge 52 will be sequentially engaged first by the leading portion 35 and then by intermediate portion 50 for shifting, wiping or otherwise disposing portions of the bead outwardly towards, thence over, and beyond edge 52 of the rim of the wheel. As the bead is being shifted from the intermediate to the trailing portion of the guide plate, it is shifted beyond or in overhanging relationship with the outer edge 52 of the rim and thence presented to and under downwardly inclined portion 58 (Fig. 3) of the trailing edge. Further relative motion between the inclined portion of the plate and the tire will effect a progressive vertical translation or lowering of the bead until it is fed beneath the depending bearing portion, or foot 60, for vertically depressing said bead and allowing it to engage under rim 52.

In this manner, one full rotation of the guide plate will mount, shift, translate or wipe the lower bead between the upper and lower outer edges 52 and 62, respectively, of the wheel.

By repeating the same process the upper bead may be mounted to the wheel.

As clearly illustrated in Figs. 2 and 3, the overall width of the intermediate portion 50 of the guide plate, as defined by upper and lower edges 54 and 56, is of such a dimension as to avoid interference of lever 26 with the tire casing adjacent the upper bead incident to the operation of mounting the lower bead of a tire.

It should be observed that no part or portion of my mounting tool is locked or otherwise attached to any portion of the wheel on which a tire is to be mounted. Sleeve 25 is free to move axially along as well as rotate about center shaft 13, and the lower edge 56 of the guide plate is urged in abutting or riding contact with outer edge 52 of the wheel solely by the weight of the mounting tool per se.

In mounting tires of light construction, it is possible to depress both beads below the upper rim 52 and the depending portion 36 will engage the upper bead and thread both beads onto the rim with one revolution of the tool.

With my improved apparatus the tire is guided in alignment with the rim and the depending portion of the tool drops the tire into the rim without undue stretching of the tire or any possibility of pinching the tube or damaging the tire.

Having thus fully described my invention, what I claim as new and desire to secure by Letters Patent, is:

1. A tire tool for mounting tire casings onto drop center rims, said tool including a lever one end of which is journaled for rotation relative to the axial center of a rim, a one piece member fixedly secured to and carried by said lever, said member formed to provide leading, intermediate and trailing portions disposed in a plane in substantial parallelism with the axis of rotation of said lever, wherein said leading portion terminates in an inturned edge disposed interiorly of the outer periphery of a rim, said intermediate portion including a lower edge constructed and arranged to freely ride upon the outer periphery of a rim, said trailing portion including a depending element which overhangs the outer periphery of a rim, said leading and intermediate portion constructed and arranged to sequentially dispose consecutive segments of the beads of a casing outwardly beyond the outer periphery of the rim, thence to and under the depending element of the trailing portion for depressing the beads beneath the outer edge of the rim incident to rotation thereof relative to a rim and its associated tire casing.

2. A tire tool for mounting tire casings onto drop center rims, said tool including a lever one end of which is journaled for rotation relative to the axial center of a rim, a one piece member fixedly secured to and carried by said lever, said member formed to provide an inturned leading, intermediate and trailing portions disposed in a plane in substantial parallelism with axis of rotation of said lever, said trailing portion including an outturned depending element which overhangs the outer periphery of a rim, and which terminates in a bearing portion spaced below the lower edge of said intermediate portion and below the outer periphery of a rim, said bearing portion and the lower edge of said intermediate portion interconnected by an inclined edge, said leading and intermediate portions constructed and arranged to sequentially dispose consecutive segments of the beads of a casing outwardly beyond the outer periphery of the rim, thence to and under the inclined edge of the depending element of the trailing portion for depressing the beads beneath said bearing portion and the outer edge of the rim incident to rotation thereof relative to a rim and its associated tire casing.

ROBERT D. HENDERSON.

(References on following page)

REFERENCES CITED

The following references are of record in the file of this patent:

UNITED STATES PATENTS

| Number | Name | Date |
|---|---|---|
| 1,025,987 | Long | May 14, 1912 |
| 1,316,390 | Rischard | Sept. 16, 1919 |
| 1,353,020 | Brand | Sept. 14, 1920 |
| 1,587,634 | Dickey et al. | June 8, 1926 |
| 1,809,169 | Kennedy | June 9, 1931 |
| 2,034,819 | Maulis | Mar. 24, 1936 |
| 2,178,101 | Hatch | Oct. 31, 1939 |
| 2,418,849 | Polt | Apr. 15, 1947 |
| 2,421,856 | Teegarden | June 10, 1947 |
| 2,439,615 | Smith | Apr. 13, 1948 |

FOREIGN PATENTS

| Number | Country | Date |
|---|---|---|
| 190,683 | Great Britain | Dec. 28, 1922 |
| 246,853 | Great Britain | May 6, 1926 |